United States Patent [19]

Schmidt

[11] Patent Number: 5,547,630
[45] Date of Patent: Aug. 20, 1996

[54] WAX PATTERN MOLDING PROCESS

[75] Inventor: Glenn Schmidt, Malibu, Calif.

[73] Assignee: Callaway Golf Company, Carlsbad, Calif.

[21] Appl. No.: 273,245

[22] Filed: Jul. 15, 1994

Related U.S. Application Data

[63] Continuation-in-part of Ser. No. 47,470, Apr. 19, 1993, Pat. No. 5,417,559, which is a continuation of Ser. No. 775,852, Oct. 15, 1991, Pat. No. 5,204,046.

[51] Int. Cl.$^6$ .............................. B29C 45/32; B29C 45/36
[52] U.S. Cl. ..................... 264/297.2; 264/328.8; 264/334; 249/63; 249/184; 425/185
[58] Field of Search .......................... 249/63, 142, 184; 425/438, 468, 185; 264/318, 328.1, 328.2, 328.7, 394, 328.8, 254, 255, 297.2

[56] References Cited

U.S. PATENT DOCUMENTS

| 3,172,667 | 3/1965 | Baker et al. |
| 3,216,072 | 11/1965 | Bauer ........................................ 249/142 |
| 4,286,766 | 9/1981 | Von Holdt .............................. 425/438 |
| 4,383,819 | 5/1983 | Letica ........................................ 425/577 |
| 4,502,660 | 3/1985 | Luther et al. .......................... 249/184 |
| 4,541,605 | 9/1985 | Kubota et al. ........................ 425/438 |
| 4,544,126 | 10/1985 | Melchert ................................ 264/255 |
| 4,650,626 | 3/1987 | Kurokawa . |
| 4,731,014 | 3/1988 | Von Holdt . |
| 4,842,243 | 6/1989 | Butler ..................................... 425/577 |
| 4,883,623 | 11/1989 | Nagamoto et al. . |
| 4,993,475 | 2/1991 | Yamada ................................. 249/184 |
| 5,204,046 | 4/1993 | Schmidt . |

Primary Examiner—Jan H. Silbaugh
Assistant Examiner—Angela Ortiz
Attorney, Agent, or Firm—William W. Haefliger

[57] ABSTRACT

A golf club head wax pattern molding process, employing a mold having a first cavity and cores in the mold cavity, including closing the mold with the cores positioned in the mold cavity, certain of the cores slidably interfitting endwise; injecting flowing heated wax into the mold to flow about the cores; allowing the injected wax to cool and solidify to form the wax pattern; removing the cores from the solidified wax pattern, while the mold holds the pattern in position in the mold, by endwise removing the cores in sequence; and opening the mold and removing the unencumbered wax pattern from the mold.

12 Claims, 6 Drawing Sheets

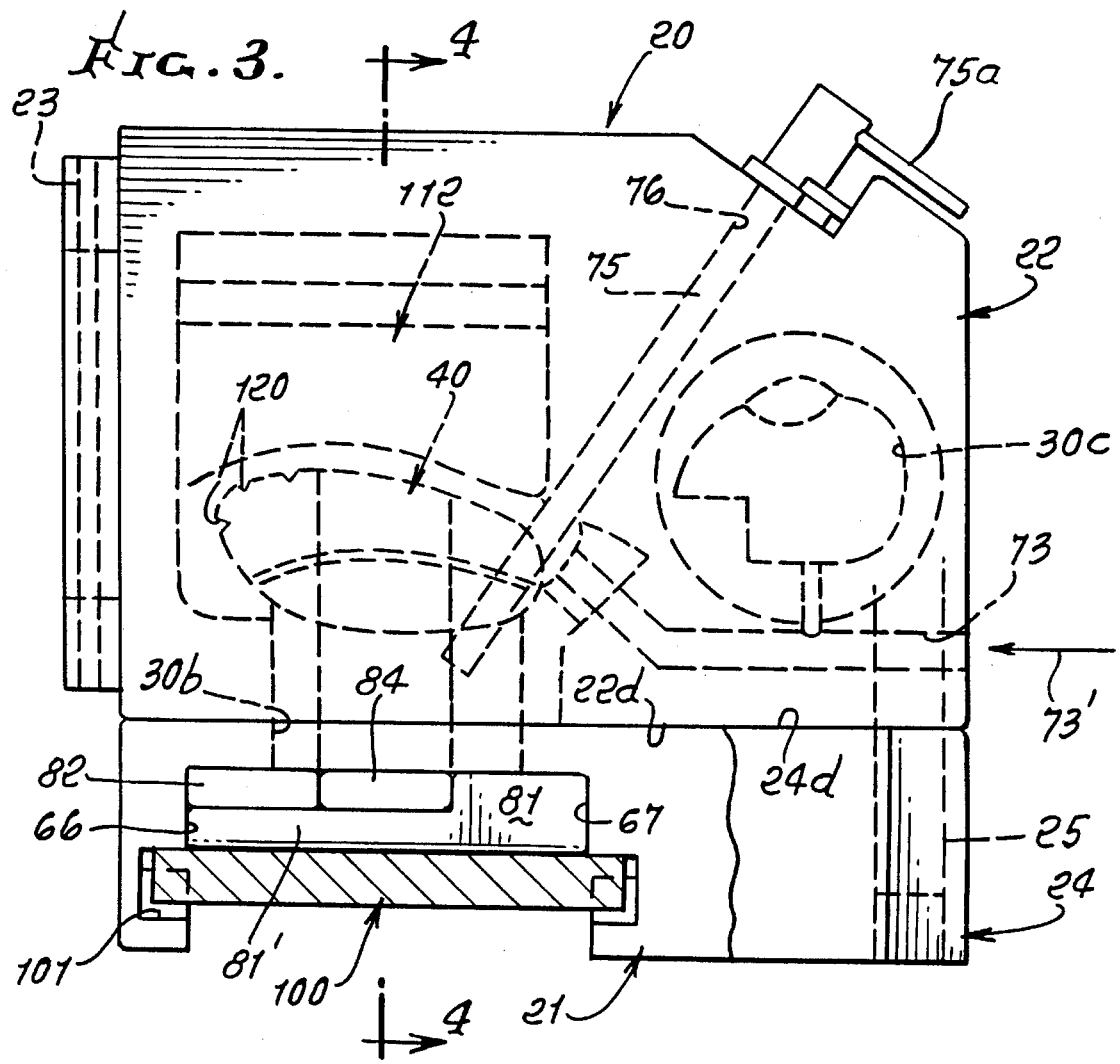
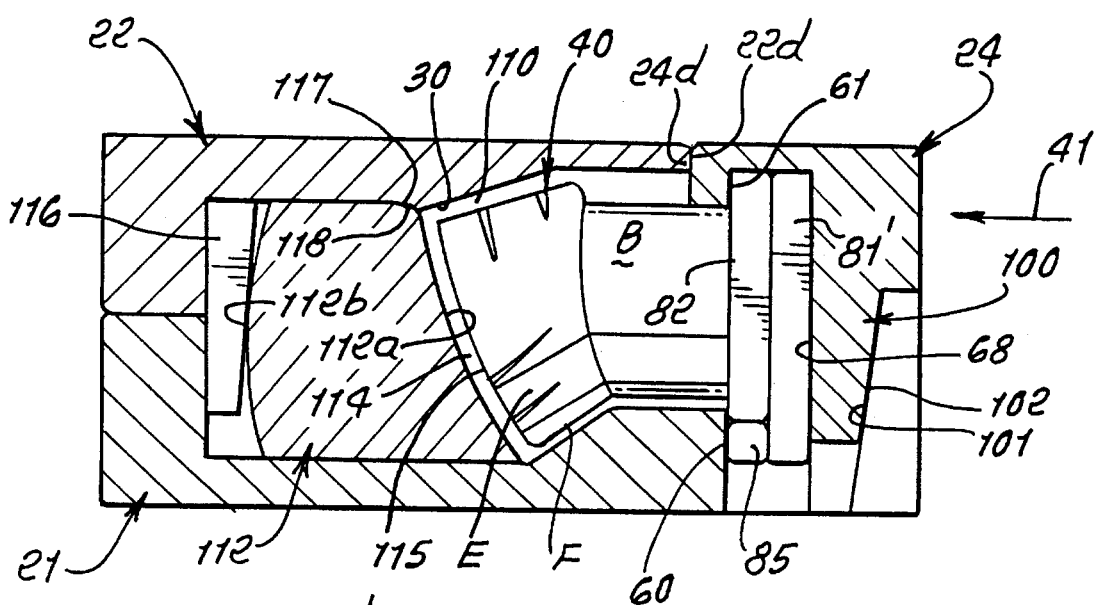

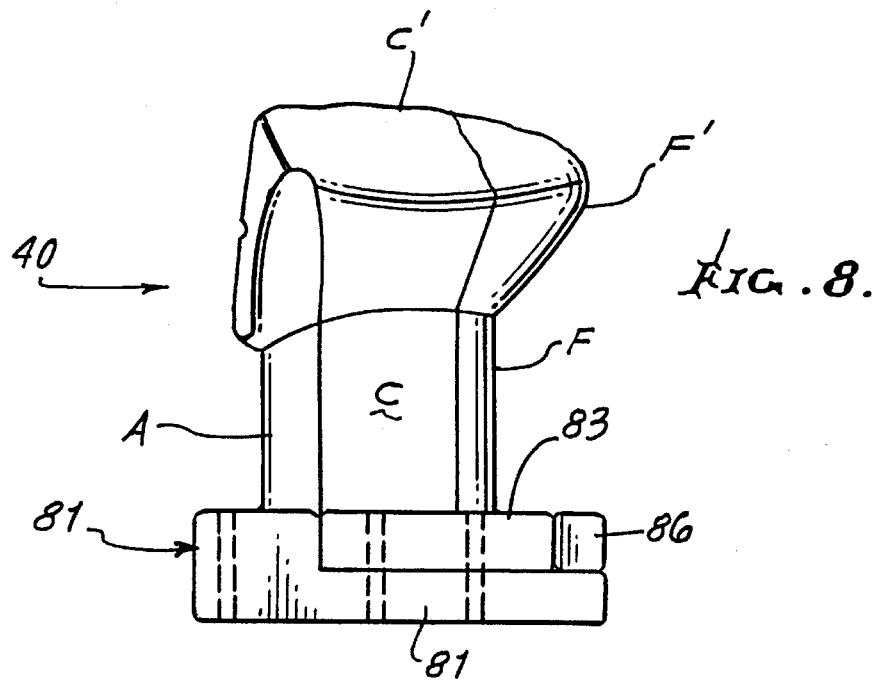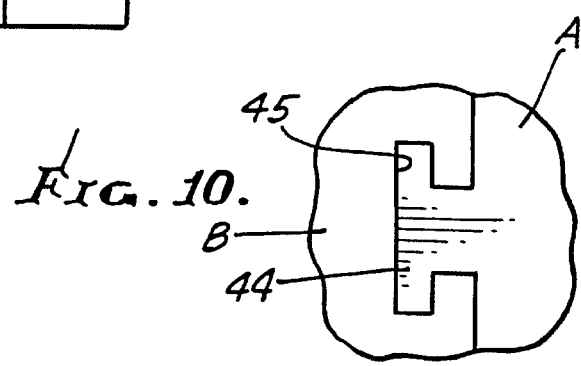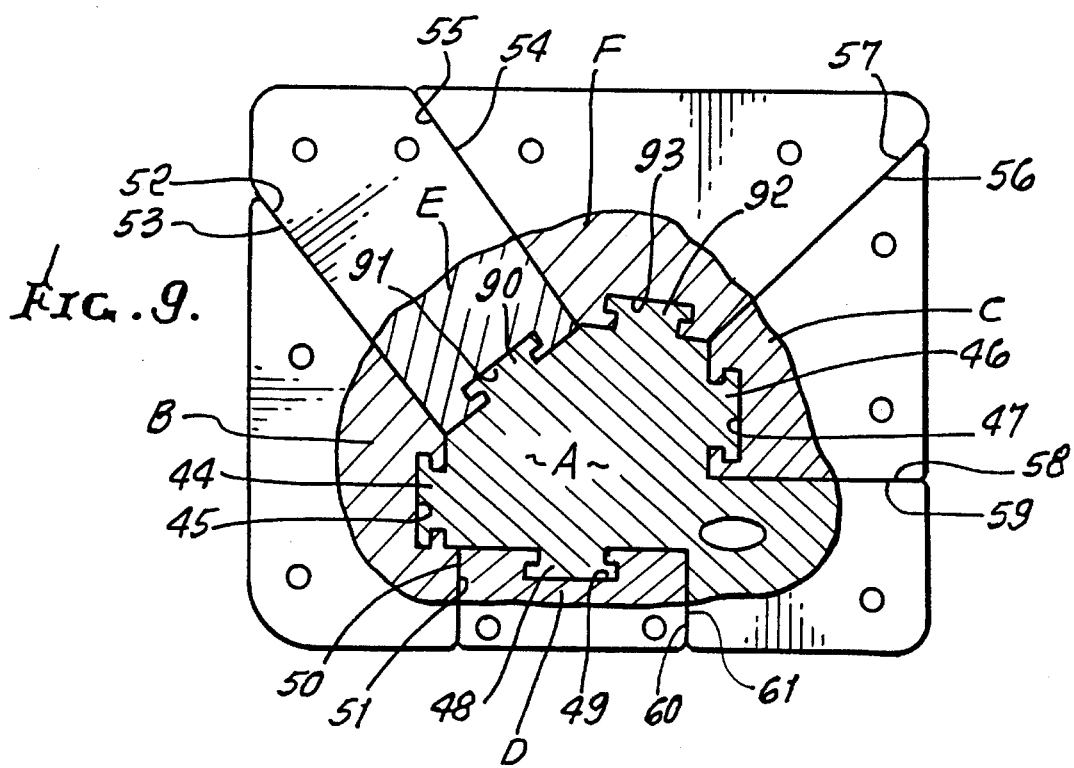

WAX PATTERN MOLDING PROCESS

This application is a continuation-in-part of Ser. No. 08/047,470 filed Apr. 19, 1993, now U.S. Pat. No. 5,417,559, which is a continuation of Ser. No. 07/775,852 filed Oct. 15, 1991, now U.S. Pat. No. 5,204,046 issued Apr. 20, 1993.

BACKGROUND OF THE INVENTION

The invention relates generally to the forming of wax patterns to be used to form objects, such as golf club heads, as via a lost wax and head casting process; and more particularly, it concerns a method that ensures the thin-walled dimensional integrity of thus formed golf club heads, as by precision formation of the wax pattern.

Currently, golf club heads, as for example "metal wood" hollow heads, are formed to have extremely thin walls, for reasons which include desired enlargement of such heads, facilitating the accurate striking and driving of golf balls. However, the production of such thin-walled heads is made difficult by the fact that inaccuracies in wall thickness, occurring for example during wax pattern formation, lead to cracking and failure of the heads upon repeated high velocity impact with golf galls. There is need for improvements in wax pattern formation methods which will overcome such problems and difficulties.

SUMMARY OF THE INVENTION

It is a major object of the invention to provide method and apparatus which will overcome such problems and enable high rate or volume production of wax patterns of precision dimensional integrity.

In accordance with the invention, the improved process to produce such wax patterns includes the steps:

a) closing a pattern mold with cores positioned in the mold cavity, certain of the cores slidably interfitting, endwise, b) injecting flowing heated wax into the mold to flow about the cores, c) allowing the injected wax to cool and solidify to form the wax pattern, d) removing the cores from the solidified wax pattern, while the mold cavity structure holds the wax pattern in position within the mold, by removing the cores in sequence, e) and opening the mold and removing the unencumbered wax pattern from the mold.

As a result, the core or core parts need not be removed from the delicate, thin-walled pattern after it has been removed from the mold, obviating damage to the pattern.

Typically, and as will be seen, the cores comprise multiple core pieces, and the above d) step includes removing the core pieces from the pattern while it remains fixated in the mold cavity, whereby the pattern becomes a hollow shell while fully stabilized in the mold.

Yet another object is to provide for preliminary positioning of the cores in the mold cavity, in wax pattern forming position, with metal-to-metal contact of core-to-mold in all three X, Y, and Z axes. As will be seen, the positioning step typically includes providing flanges on the cores, and a stop shoulder on the mold, and wedging a flange against the stop shoulder during the a) step, further locking the cores against metal of the mold base, via the flange wedging action, achieving absolute location relative to the cavity geometry.

This ensures integrity of wall thickness. Also, the core assembly is typically and advantageously inserted into the mold with core metal-to-mold metal relative sliding guidance. The method is such as to allow removal of the core pieces one-by-one, and unidirectionally from the delicate wax pattern, fixated and stabilized in the mold.

A further object includes providing a mold that includes a base and two covers, to cover different portions of the base, and step d) includes opening one cover to allow the removal of the core pieces from the wax pattern while the pattern remains positioned in the mold. Also, step e) may then include opening the other cover to allow removal of the entire wax pattern from the mold, free of the core pieces which were previously removed.

Yet another object is to provide the mold with a second cavity and an associated core therein to form a golf club head sole plate pattern, and including the step of allowing some of the injected wax to flow to the second cavity.

An additional object is the provision of an insert cavity facing the cores in the mold cavity, and including providing an insert in the insert cavity and urging the insert toward predetermined spaced relation relative to the cores in response to closing of the mold cover toward the mold body. That insert, which may form the head top (of the wax pattern), may be accurately located by means of a wedge, as will be seen.

Finally, the core pieces are typically removed from the pattern via that portion of the pattern which defines an opening, which corresponds to the position of a golf club head sole plate, to be separately attached to the cast golf club head.

These and other objects and advantages of the invention, as well as the details of an illustrative embodiment, will be more fully understood from the following specification and drawings, in which:

DRAWING DESCRIPTION

FIG. 3 is an enlarged plan view of the FIG. 1 structure, partly broken away to show the location of wedge means;

FIG. 4 is an elevation taken on lines 4—4 of FIG. 3;

FIG. 8 is an elevation taken on lines 8—8 of FIG. 6;

FIG. 9 is a section taken on lines 9—9 of FIG. 6 showing the front side of insert or core structure;

FIG. 10 is an enlarged fragmentary view showing a T-connection (of insert or core parts) as also seen in FIG. 9.

DETAILED DESCRIPTION

Figure 1:
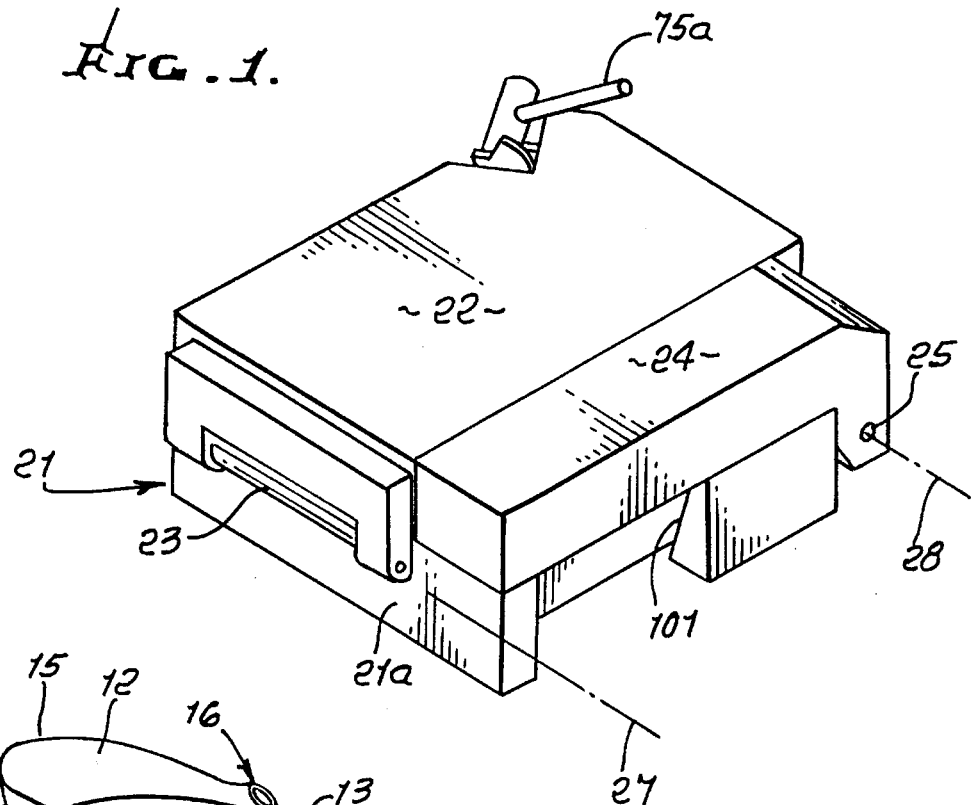
FIG. 1 is a perspective view of mold structure embodying the invention.
Figure 1A:
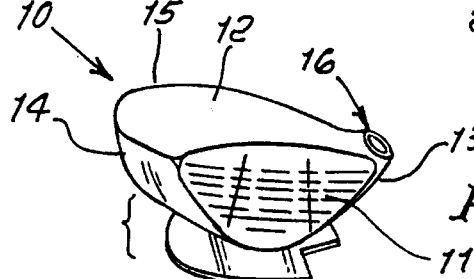
FIG. 1a is a perspective view of a wax pattern of a golf club head and sole plate.

Referring first to FIG. 1a, the wax pattern 10 to be produced has the shape of a golf club (metal wood) head. The head has surface portions corresponding to those of a metal wood head to be produced using a "lost wax" process, those portions seen in FIG. 1a includes a ball-striking face 11, a top wall 12, heel 13, toe 14, rear 15, and hosel region 16.

Figure 2:
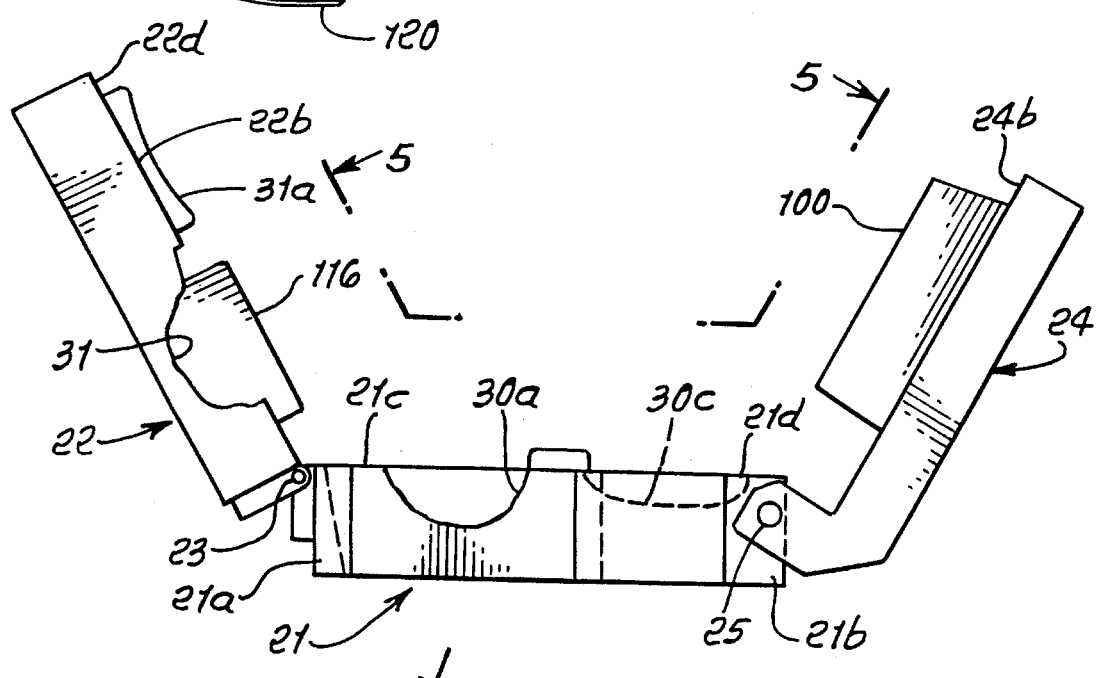
FIG. 2 is a side view of the FIG. 1 structure showing hinged mold parts in opened (lifted) condition.

The FIG. 3 mold structure 20 employed, as seen in FIGS. 1 and 2, includes a mold body 21, a first mold cover 22 having hinge or other type connection at 23 to one end portion 21a of body 21; and a second mold cover 24 or other means having hinge or other connection at 25 to the opposite end portion 21b of body 21. Hinge axes 27 and 28 are parallel, as seen in FIG. 1; cover 22 extends over (folds over) one portion 30a of the mold body cavity; and cover 24 extends over (folds over) another portion 30b of the mold body cavity. An additional mold body cavity 30c (see FIGS. 2 and 3) is formed in 21, for forming the head sole plate. See also FIGS. 3 and 4 Note also cavity 31 in cover 22 that registers with cavity 30a in closed condition of the mold structure, and insert structure 31a on cover 22 that registers with cavity 30c. Each of elements 21, 22 and 24 has metallic block form, for example; cover surface 22b, when closed, seats on body surface 21d; and cover surface 24b, when closed, seats on body surface 21c. Also, when the covers are closed, cover side surface 22d lies closely adjacent cover side surface 24d (see FIG. 4), throughout the lengths of the two covers. All covers may be moved by linear translation upwardly, instead of by rotation about hinge or pivot axes.

Figure 5:
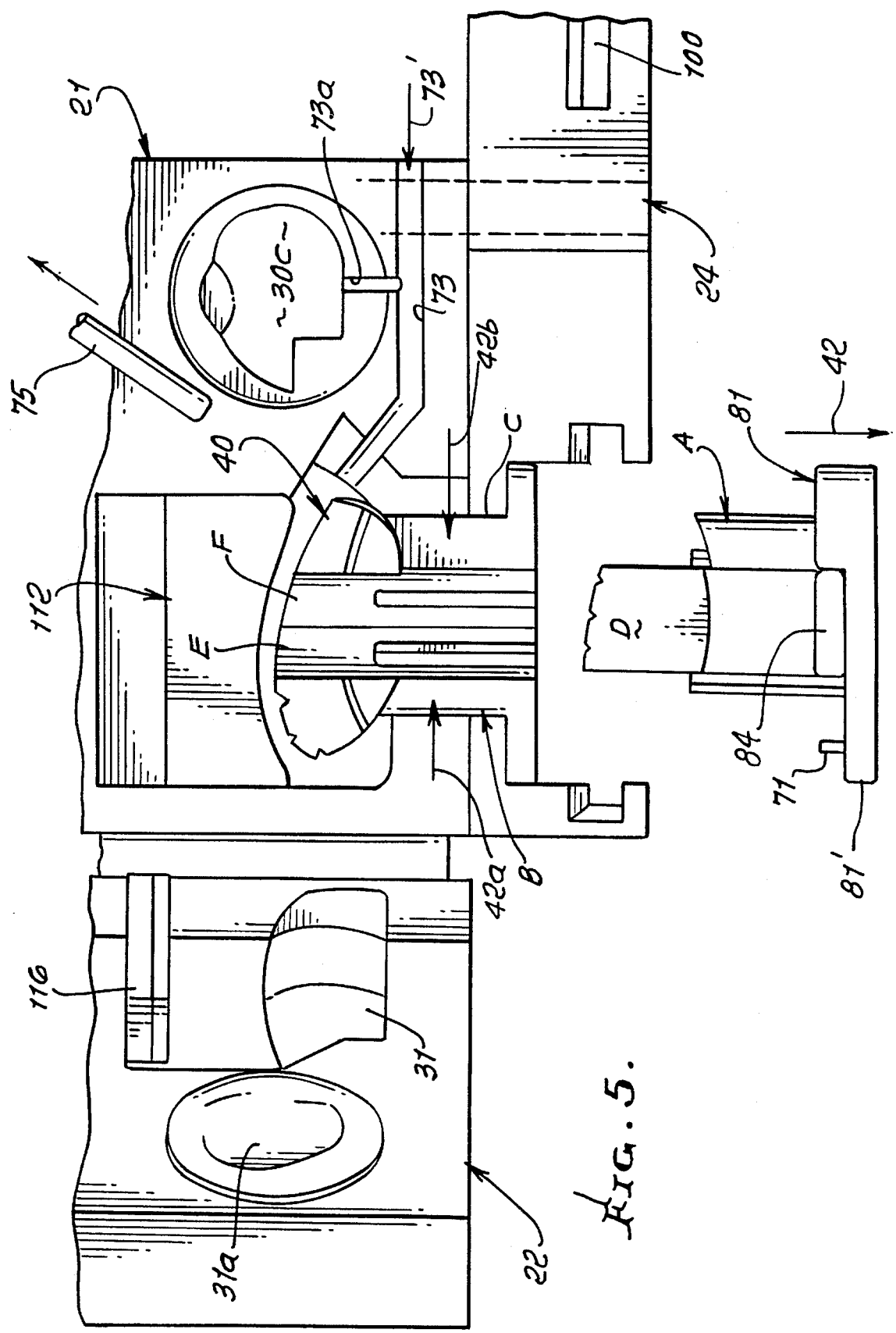
FIG. 5 is an enlarged plan view taken on lines 5—5 of FIG. 2 and showing insert removal.

Reference to FIG. 4, as well as to other views, will show the following additional structure: a core or insert assembly 40 is positioned or inserted into the cavity 30 (as in insertion direction 41); and the two covers 22 and 24 are closed to FIGS. 1, 3, and 4 condition. The assembly 40 includes multiple core pieces or parts, as for example are designated at A, B, C, D, E, and F (see FIG. 9). Piece A may be considered as a base, and the pieces B, C, D, E, and F are assembled to the base, unidirectionally, to allow them to be separately withdrawn from the mold in that endwise direction (see arrow 42) in FIG. 4, after opening of only one cover, i.e., cover 24. Piece A is removed first, in direction 42, and then pieces B–F are removed in direction 42 after external shifting, as in directions 42a and 42b, as seen in FIG. 5. Additional core pieces can be employed.

In this regard, core piece B has tongue and groove connection to A, as at T-tongue 44 and T-groove 45; core piece C has tongue and groove connection to A, as at T-tongue 46 and T-groove 47; core piece D has tongue and groove connection to A, as at T-tongue 48 and T-groove 49; core piece E has tongue and groove connection to A, as at T-tongue 90 and T-groove 91; and core piece F has tongue and groove connection to A, as at T-tongue 92 and T-groove 93. Note the interfitting piece side walls 50 and 51, 52 and 53, 54 and 55, 56 and 57, 58 and 59, and 60 and 61. All these walls define planes extending longitudinally in the direction of arrow 42, allowing the part A to be first removed in direction 42, and the parts B–F to be removed via the cavity or cavities remaining after removal of part A and other parts.

Figure 7:
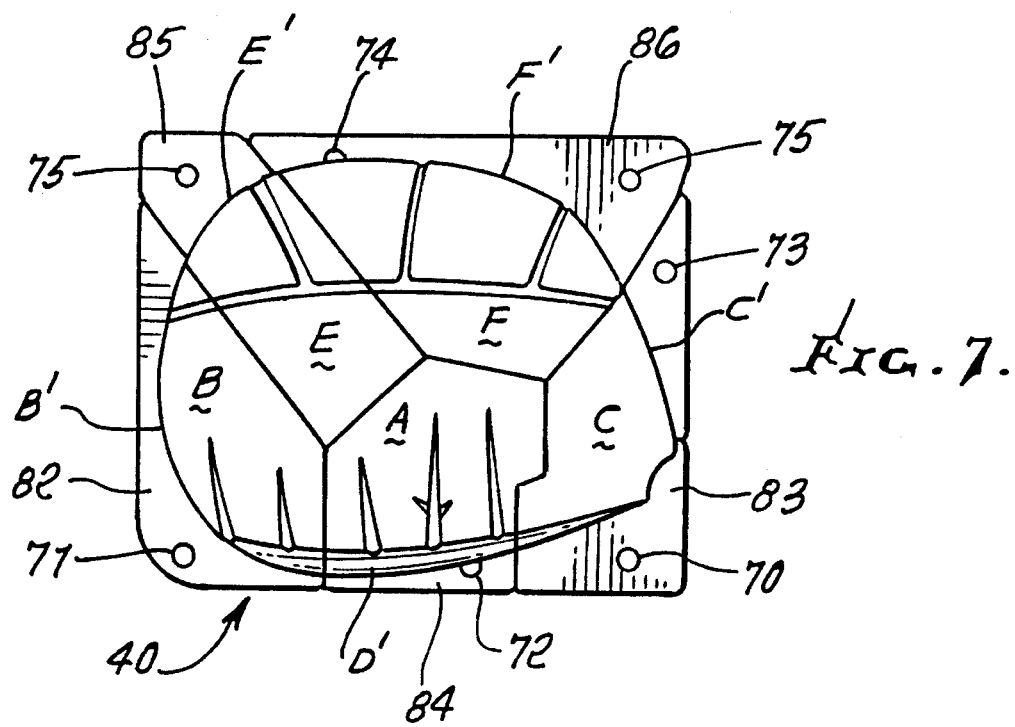
FIG. 7 is an elevation taken on lines 7—7 of FIG.
Figure 11:
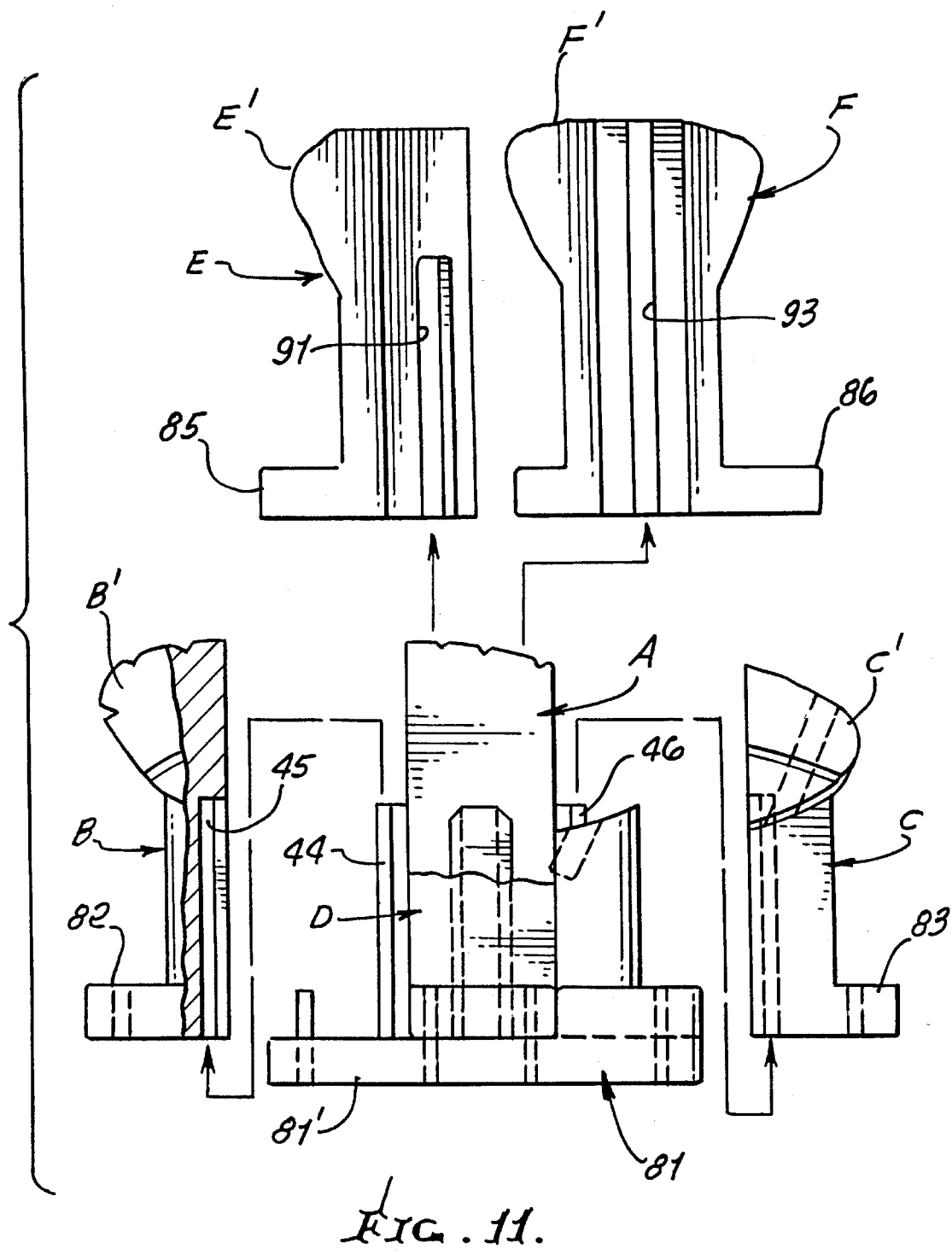
FIG. 11 is an exploded view of the insert parts, as seen from the rear side of the insert, opposite to that of FIG. 9.

In this regard, note portions B', C', D' and F' that overhang side walls of A, as in FIG. 7, those portions B', C', D', E' and F' having surfaces defining the toe, heel, rear, and front walls of the golf club head to be produced from the wax pattern conforming to B', C', D', E' and F'. The golf club head face is to be formed by surfaces of B, C and D. See FIG. 7.

Note also that the core has an integral flange defined for example by the sub-flanges 81–86 on the core parts A–F, respectively. See FIGS. 7 and 9. Sub-flange 81, integral with A, also defines a base 81' on which sub-flanges 82–86 seat (see plane 181), to limit the assembly of the core pieces B–F to A. Pins 70–75 extend in direction 42 and interconnect flanges, as shown in FIG. 7 and 9. Flanges 81–86 in turn seat against the peripheral stop shoulders as at 60 and 61 defined by mold body 21 and by the cover 24 (see FIG. 4) when assembled into the mold in direction 41, and when the cover 24 is closed. See also peripheral guide surfaces 66–68 (FIGS. 3 and 4) defined by the body 21, to guide the flanges as they are finally assembled into the mold, providing a 360° pipe-like "trap" of metal which confines outer peripheries of the core parts 81–86. A wedge 100, integral with the cover 24, or other convenient transport and location mechanism, engages the angled inner surface 101 of body 21, and snugly pushes the sub-flanges into position when the cover is closed down, as seen in FIG. 4, the flanges engaging 60 and 61, when that cover is closed into position, as shown. Note wedge and mold body interengagement surfaces 102 and 101. Thus, the core is positively positioned in the mold cavity (cavities) in wax pattern forming position of the mold, with metal-to-metal contact of the core flanges with the mold, in all three X, Y, and Z axes.

The resultant thin-walled cavities 110, formed by the mold base 21 and cover 22, and cores or inserts A–F, are precision dimensioned to receive hot wax, as via a port 73. See feed direction arrow 73' in FIG. 3.

Figure 6:
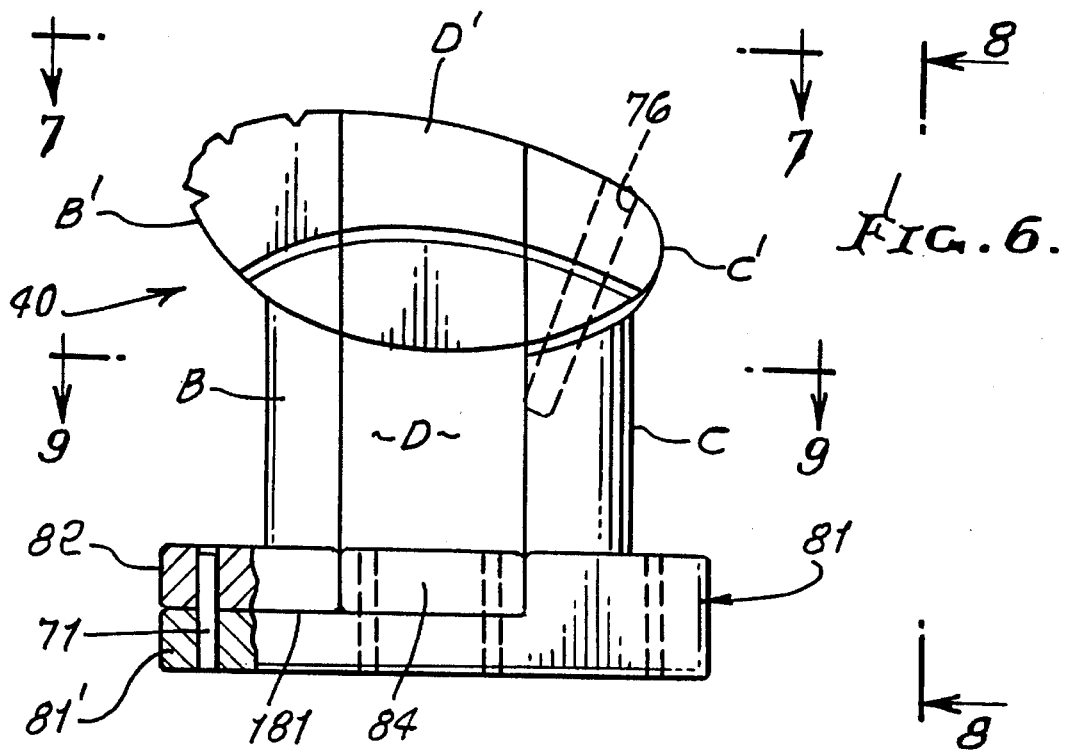
FIG. 6 is a plan view of core or insert structures in assembled condition.

The space in the club head to be occupied by the golf club shaft is formed by an insert pin 75, during molding. It extends through a bore 76 in the cover 22 (as indicated in FIGS. 1, 3 and 5) and also into the insert C, as shown in FIG. 6. Insert pin manipulation handle 75a protrudes for access, as seen in FIGS. 1 and 3.

The crowned insert 112 is shown in cavities 113 and 114 in 21 and 22, as viewed in FIG. 4. It has a concave end surface 112a, spaced at 114 from the top surfaces of the inserts B–F, and represented at 115 in FIG. 4. A wedge 116 is carried by 22, to be swung down into position engaging the opposite crowned end surface 112b of 112 to urge 112 toward A–F, and to engage shoulder 117 on 112 against angled stop shoulder 118 on 22, to precisely space 112a from 115. This occurs upon mold apparatus closure. Accordingly, hot, flowing wax may pass within space 114 and into grooves 120 on the tops of B–F, those grooves corresponding to dendrites to be found on the inner side of the top and rear walls of the head. See U.S. Pat. No. 5,180,166, incorporated herein by reference.

FIGS. 2, 3 and 5 show simultaneous formation of a wax pattern sole plate 120 (see FIG. 1a), to be used in ultimate casting of a metallic sole plate for closing the cast hollow head cavity. See the sole plate or bottom wall description in U.S. Pat. No. 5,301,945, incorporated herein by reference. As shown herein, the sole plate forming insert or core 31a is carried by cover 22, to be swung downwardly directly over cavity 30c in 21, to project in that cavity so that hot wax supplied to the cavity will form the wax pattern 120 corresponding to the sole plate to be attached to the metal head.

FIGS. 3 and 5 show the branch duct 73a communicating between the supply duct 73 and the cavity 30c, whereby wax patterns of a head and of the sole plate are simultaneously formed.

The steps of the wax molding process include a) closing the mold with the cores positioned in the mold cavity, b) injecting flowing heated wax into the mold to flow about the cores, c) allowing the injected wax to cool and solidify to form the wax pattern of the head and sole plate, d) removing the cores A–F unidirectionally from the solidified wax pattern of the head, while the mold holds that wax pattern in position fixated in the mold, e) and opening the mold and removing the unencumbered wax patterns of both the head and sole plate from the mold.

As referred to above, step d) may typically include opening cover 24 and then removing the core pieces A–F from the club head pattern, which remains in mold body 21 and in closed cover 22, so that the pattern becomes a hollow wax shell in the mold (closed parts 21 and 22). Core A is removed first, and then cores B–F are removed, one by one. As referred to, the positioning step a) includes providing a flange or flanges on the cores, a stop shoulder on the mold, and wedging the flange or flanges against the stop shoulder during the a) step; and the core assembly is guidably inserted into the mold with core metal-to-mold metal relatively sliding guidance, and fixation in three X-Y-Z orthogonal dimensions.

In the above, in the case of molding a golf club head, the core inserts are removed one-by-one from that portion of the wax pattern that corresponds to the sole of the golf club head; then, after casting of a club metal head and sole plate, the metal sole plate is attached, as by welding, to the head to enclose the hollow head interior.

I claim:

1. In a golf club head wax pattern molding process, employing a mold having a first cavity and cores extending endwise in the first cavity, the steps that include
   a) closing the mold with the cores positioned in the first cavity, certain of the cores slidably interfitting endwise,
   b) injecting flowing heated wax into the first cavity to flow about the cores,
   c) allowing the flowing heated wax to cool and solidify to form the wax pattern,
   d) removing the cores from the wax pattern, while the mold holds the wax pattern in position in the mold, by endwise removing the cores in sequence,
   e) then opening the mold and removing the wax pattern from the mold,
   f) providing the mold to have a body and first and second covers, and locating said first cavity to be covered by the second cover,
   g) providing a second cavity in the mold,
   h) and the first cavity formed in the shape of a golf club head, and the second cavity formed in the shape of a golf club head sole plate being kept closed by the second cover during step d), after opening of said first cover,
   i) allowing some of the flowing heated wax to flow to the second cavity, there being an additional core, for the wax pattern for the sole plate, carried by the second cover,
   j) and wherein the cores comprise multiple core pieces, and step d) includes removing the core pieces from the wax pattern in the mold, in a manner such that the pattern becomes a hollow shell supported in and by the mold,
   k) the core pieces having ends that define the interior configuration of a golf club head,
   l) and wherein said core pieces are removed from the wax pattern via that portion of the wax pattern which defines an opening which corresponds to a position of said golf club head sole plate to be separately attached to a cast golf club head, and molding a wax pattern of the sole plate in the mold at the same time that said steps b) and c) are carried out.

2. In a golf club head wax pattern molding process, employing a mold having a first cavity and cores extending endwise in the first cavity, the steps that include
   a) closing the mold with the cores positioned in the first cavity, certain of the cores having endwise elongation and slidably interfitting endwise,
   b) injecting flowing heated wax into the first cavity to flow about the cores,
   c) allowing the flowing heated wax to cool and solidify to form the wax pattern,
   d) removing the cores from the wax pattern, while the mold holds the wax pattern in position in the mold, by endwise removing the cores in sequence,
   e) and then opening the mold and removing the wax pattern from the mold,
   f) the mold having a second cavity and an associated core therein to form a golf club head sole plate pattern, and including the step of allowing some of said flowing heated wax to flow to the second cavity,
   g) the mold including a body and first and second covers to cover different portions of the body,
   h) step d) including opening the first cover to allow removal of the cores from the wax pattern for the head, while the second cover remains closed, and while the wax pattern for the head remains positioned in the mold, and also while the wax pattern for the sole plate remains positioned in the mold,
   i) said associated core for the wax pattern for the sole plate being carried by said second cover,
   j) the cores comprising multiple core pieces, and step d) includes removing the core pieces from the wax pattern for the head in the mold, in a manner such that the wax pattern for the head becomes a hollow shell supported in and by the mold, the core pieces being removed one by one, and unidirectionally,
   k) step e) including opening the second cover to allow removal of the wax pattern for the head from the mold, and then removing said wax pattern for the head.

3. The method of claim 2 including preliminarily positioning the cores in the first cavity, in wax pattern forming position, with metal-to-metal locating of the cores relative to the mold in all three X-Y-Z orthogonal dimensions.

4. The method of claim 2 wherein the second cover and body form an insert cavity facing the cores in the mold cavity, and including providing an insert in said insert cavity and urging said insert toward predetermined spaced relation relative to the cores in response to closing of the second cover toward the body.

5. The method of claim 3 wherein said positioning includes providing flanges on the cores, and a stop shoulder on the mold, and wedging the flanges against the stop shoulder during step a).

6. The method of claim 3 wherein the cores are guidably inserted into the mold with core metal to mold metal relatively sliding guidance.

7. The method of claim 2 wherein the core pieces have bulbous ends that define an interior configuration of a golf club head.

8. In a golf club head wax pattern molding process, employing a mold having a first cavity and cores extending endwise in the first cavity, the steps that include
   a) closing the mold with the cores positioned in the first cavity, certain of the cores having endwise elongation and slidably interfitting endwise,
   b) injecting flowing heated wax into the first cavity to flow about the cores,
   c) allowing the flowing heated wax to cool and solidify to form the wax pattern, d) removing the cores from the wax pattern, while the mold holds the pattern in position in the mold, by endwise removing the cores in sequence, e) and then opening the mold and removing the wax pattern from the mold, f) the mold having a second cavity and an associated core therein to form a golf club head sole plate pattern, and including the step of allowing some of said flowing heated wax to flow to the second cavity, g) the mold including a body and first and second covers to cover different portions of the body, h) step d) including opening the first cover to allow removal of the cores from the wax pattern for the head, while the second cover remains closed, and while the wax pattern for the head remains positioned in the mold, and also while the wax pattern for the sole plate remains positioned in the mold, i) said associated core for the wax pattern for the sole plate being carried by said second cover, j) and wherein the cores comprise multiple core pieces, and step d) includes removing the core pieces from the wax pattern for the head in the mold, in a manner such that the wax pattern for the head becomes a hollow shell supported in and by the mold, the core pieces being removed one by one, and unidirectionally, k) the core pieces having bulbous ends that define an interior configuration of a golf club head, l) and wherein said core pieces are removed from the wax pattern for the head via that portion of the wax pattern for the head which defines an opening which corresponds to the position of said golf club head sole plate to be separately attached to a cast golf club head, and molding the wax pattern of the sole plate in the mold at the same time that said steps b) and c) are carried out.

9. The method of claim 8 wherein the core pieces are removed from the wax pattern for the head, one-by-one, and unidirectionally.

10. The method of claim 9 wherein step e) includes opening the second cover to allow removal of the wax pattern from the mold, and then removing said wax pattern for the head.

11. The method of claim 8 wherein the core pieces have tongue and groove interconnections, and are removed unidirectionally, as accommodated by relative sliding of said tongue and groove interconnections.

12. In a golf club head wax pattern molding process, employing a mold having a first cavity and cores in the first cavity, the steps that include a) closing the mold with the cores positioned in the first cavity, certain of the cores slidably interfitting endwise, b) injecting flowing heated wax into the first cavity to flow about the cores, c) allowing the flowing heated wax to cool and solidify to form the wax pattern, d) removing the cores from the wax pattern, while the mold holds the wax pattern in position in the mold, by endwise removing the cores in sequence, e) then opening the mold and removing the wax pattern from the mold, f) the cores comprising multiple core pieces, and step d) includes removing the core pieces from the wax pattern in the mold, in a manner such that the wax pattern becomes a hollow shell supported in and by the mold, g) the core pieces being removed from the wax pattern, one-by-one, and unidirectionally, h) the mold including a base and first and second covers to cover different portions of the base, and step d) including opening the first cover to allow said removal of the core pieces from the wax pattern while the wax pattern remains positioned in the mold, i) said step e) including opening the second cover to allow removal of the wax pattern from the mold, and then removing said wax pattern for the head, j) and wherein there are at least six A, B, C, D, E, and F of said core pieces, and they are removed one-by-one and unidirectionally, piece A removed first, and pieces B through F removed after shifting at least partly into the cavity formed by removal of piece A.

* * * * *